May 13, 1958 P. J. SELGIN 2,834,922

CELLULAR METHOD OF ELECTRONIC ASSEMBLY

Filed May 28, 1954

INVENTOR.
PAUL J. SELGIN

BY

R. I. Tompkins

ATTORNEYS

United States Patent Office 2,834,922

Patented May 13, 1958

2,834,922

CELLULAR METHOD OF ELECTRONIC ASSEMBLY

Paul J. Selgin, Washington, D. C., assignor to the United States of America as represented by the Secretary of the Navy

Application May 28, 1954, Serial No. 433,311

5 Claims. (Cl. 317—101)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus which facilitates the assembling of the components of an electronic circuit with a printed circuit.

In the prior art one common method of joining the components of an electronic circuit to a printed circuit was by the use of soldered connections. Soldering has certain inherent drawbacks, namely, that it is difficult to assemble the parts of the circuit; the assembled circuit cannot be disassembled without breaking the soldered connections; both assembly and disassembly of a soldered circuit is a time consuming operation; and special equipment is required.

The instant invention overcomes the above mentioned drawbacks of the prior art by providing a cellular electronic construction in which replaceable cell units of standard size are used to couple terminals of a printed circuit to the pins of electronic tubes through various electrical elements without the use of soldered connections. This invention is based on a general observation relating to electronic circuits and a physical principle. The general observation is that in many instances a maximum of two current paths branch off from each pin of an electron tube. The physical principal is that if a substantially rectangular block possesses a first surface which has two projections extending therefrom, and this block has pressure applied to a second surface thereof which is oppositely positioned relative to said first surface, that if this pressure is effectively applied to said second surface so that the line of force extends between the two aforementioned projections that the projections will seat themselves firmly on any surface against which they are pressed. The instant invention utilizes the foregoing two phenomena. Structurally, the instant invention consists of a plurality of cell frames which are affixed to a printed circuit sheet by means of suitable connections such as screws. For the sake of simplicity of description only one cell frame and its associated structure will be described, but it is to be understood that a plurality of these cell frames are used in actual practice. The cell frame consists of a spring block which is spaced from the printed circuit by spaced members. The spring block serves as a base upon which conductive spring members are mounted. A top plate is secured to the spring block and serves the function of providing a receptacle for the pins of an electron tube and for securely holding the conductive spring members in position on the spring block. The conductive spring members perform a dual function. They provide a contact for the pins of an electron tube, which is inserted into said top plate, and also provide the necessary spring pressure for holding the cells, which are inserted into the cell frame, securely in contact with the required portions of the printed circuit. Each of the cells which is inserted into the cell frame houses certain electrical elements which are electrically connected between the top and bottom surfaces of the cell. The top surface of each cell is engaged by the above mentioned conductive spring which is electrically coupled to a pin of the electron tube. The bottom surface of each cell has two projections extending therefrom. The conductive spring presses these projections into electrical contact with two points of the metallized printed circuit pattern. These points are electrically coupled to the conductive spring (and pin of the electron tube) through the electrical elements housed within each cell. Thus it can be seen that the foregoing assembly eliminates the need for soldered connections between a printed circuit and the various elements of the circuit.

It is accordingly one object of the instant invention to disclosed apparatus for joining the components of an electronic circuit to a printed circuit without the use of soldered connections.

It is another object of the invention to disclose electronic apparatus which lends itself to quick replacement of parts.

It is still another object of this invention to disclose electronic apparatus which lends itself to rapid servicing.

Other objects and many of the attendant advantages of this invention will be readily appreciated as the same becomes better understood by reference to the following detailed description when considered in connection with the accompanying drawing wherein.

Reference is now made to the various figures of the drawing in which like numerals represent like parts.

Figure 1:
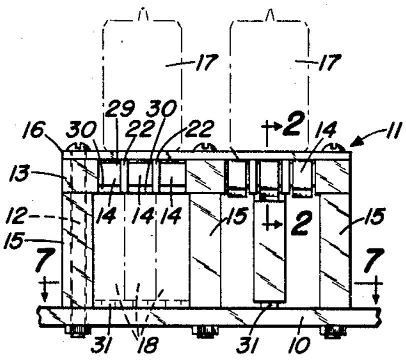
Fig. 1 is an elevational view of an assembled cell frame attached to a printed circuit.
Figure 2:
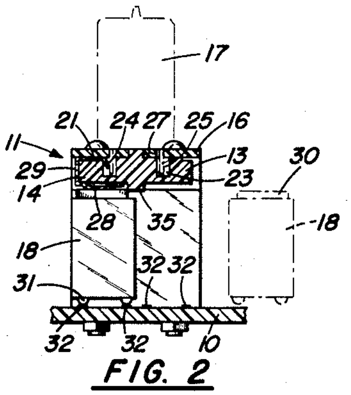
Fig. 2 is a view taken along line 2—2 of Fig. 1.
Figure 3:
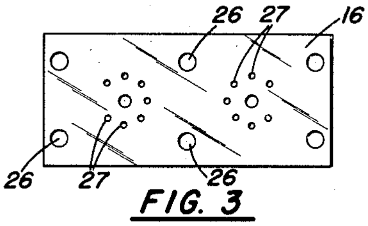
Fig. 3 is a plan view of the top plate of the cell frame.

In Fig. 1 there is shown a non-conductive sheet 10 which has a circuit printed thereon. Cell frame 11 is adapted to be affixed to sheet 10 by means of bolts 12. The cell frame consists of a spring block 13, Figs. 1, 2 and 4, which is made of plastic or any other suitable non-conductive material. The spring block 13 serves the function of mounting conductive springs 14, Figs. 1, 2 and 5. The spring block 13 is spaced from the printed circuit by spacer members 15. Top plate 16, Figs. 1, 2 and 3, is positioned on top of spring block 13 and serves the functions of (1) providing a base for the electron tubes 17, shown in phantom in Figs. 1 and 2, and (2) holding conductive springs 14 securely in place on spring block 13. The top plate 16 is made out of a suitable non-conductive material. Cells 18, Figs. 1, 2 and 6, which house electrical elements are adapted to be inserted into the cell frame 14 to provide electrical contact between the printed circuit and the conductive springs 14. Each conductive spring 14 serves the dual function of contacting a pin of electron tube 17, Fig. 2, and providing the necessary spring pressure to force the lower surface of cell 18 firmly into engagement with terminals on the circuit which is printed on sheet 10. The foregoing description has given a general overall description of the entire assembly. The individual elements of the assembly will be described in detail hereafter.

Figure 4:
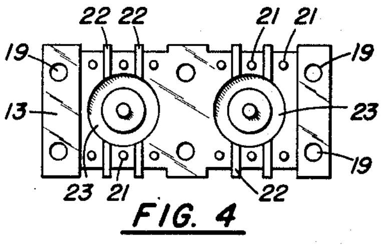
Fig. 4 is a plan view of the spring block.

Attention is directed to Fig. 4 which shows a plan view of spring block 13. As mentioned previously, this block is made of a non-conductive material. Holes 19 are provided in block 13 through which bolts 12 are adapted to fit. Springs 14, which fit over the end of block 13, have holes 20 formed therein, Fig. 5. These holes are adapted to fit over lugs 21, Fig. 4, which are formed integrally with block 13. The holes 20 and lugs 21 hold conductive springs 14 firmly in position on the block 13, Fig. 2. Ribbed projections 22 are formed on block 13. One of the functions of ribs 22 is to provide the necessary insulation between adjacent conductive springs 14, Fig. 1. Spring block 13 has a plurality of annular channels 23 formed therein. The ends 24 of conductive springs 14 fit into channels 23. The channels 23 also have the necessary clearance so that the pins 25 of the electron tube 17, Fig. 2, can fit therein and contact portions 24 of the conductive springs 14.

The top plate 16, Fig. 3, has holes 26 formed therein which coincide with holes 19 of spring block 13. These holes are also adapted to receive bolts 12. The top plate 16 is made of non-conductive material. This plate serves the dual function of (1) providing the necessary holes 27 for receiving and rigidly holding the pins of electron tube 17, and (2) rigidly locking conductive springs 14 to spring block 13.

Figure 5:
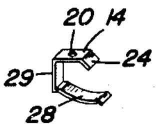
Fig. 5 is a perspective view of a conductive spring.

The structure of conductive spring 14 is best shown in Fig. 5. This conductive spring is made of a suitable conductor and is suitably tempered so as to have the desired spring properties. In addition to the above described structure of the spring 14, it can readily be seen that it is shaped generally in the form of a U. The portion 28 of conductive spring 14 is positioned on the underside of spring block 13, Fig. 2, and is adapted to provide the necessary pressure to force cell 18 into contact with the printed circuit. It will be noted at this point that portions 29 of the conductive spring 14 are freely accessible for testing the voltages at the pins of the electron tube without requiring disassembly of the circuit.

Figure 6:
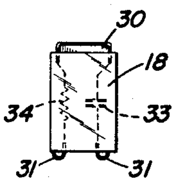
Fig. 6 is an elevational view of a cell which is adapted to be inserted into the cell frame.

The structure of an individual cell 18 will now be described, attention being directed to Fig. 6. The cell is molded of a suitable non-conductive material and is in the general shape of a rectangular block. The top surface of cell 18 has a small rectangular projection 30 formed integrally therewith. This projection fits between adjacent ribs 22 of spring block 13, Fig. 1. In this manner, each cell is rigidly held within the cell frame 11 when it is inserted therein. The bottom surface of cell 18 has two projections 31 formed thereon, Fig. 6. It is these projections which contact suitable terminals 32 of the printed circuit, Fig. 2. Electrically connected between projections 31 and 30 are electrical elements such as capacitor 33 and resistor 34. It will be noted at this point that projections 30 and 31 are each clad with a conductor which is in turn connected to leads (not numbered) which couple electrical elements 33 and 34 between projections 30 and 31.

Attention is now directed to Fig. 2 for an explanation of how the cells 18 are inserted into the cell frame 11. At the right in Fig. 2 is a cell 18, shown in phantom, which is in position to be inserted into the cell frame 11. At the left of Fig. 2 a cell 18 is shown in position in the cell frame. It can readily be seen that the portion 28 of spring 14 bears against the central portion of projection 30 of cell 18. The line of force of this spring pressure effectively extends intermediate projections 31 on the lower surface of block 18. Therefore since block 18 bears against printed sheet 10 at only two points, it can be seen that each of these points will be in firm engagement with the printed sheet. It will be noted that the underside of spring block 13 has ridge 35, Fig. 2, centrally located thereon and extending longitudinally thereof. This ridge is for the purpose of providing a positive stop for the cells 18 which are inserted into cell frame 13. It will be further noted that the conductive springs serve the dual function of (1) providing an electrical contact between the pins 25 of the electron tube 17 and the cells 18 and (2) provide the necessary spring pressure to hold cells 18 against the printed circuit.

Figure 7:
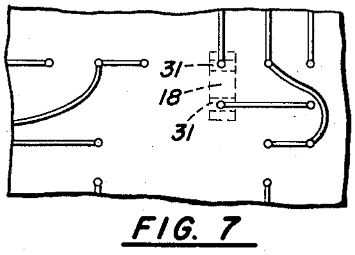
Fig. 7 is a view taken along line 7—7 of Fig. 1 which shows the terminals of the printed circuit with which the cell makes contact.

Fig. 7 is taken on line 7—7 of Fig. 1. This figure shows the circuit which is printed on sheet 10. It can readily be seen from this figure that the projections 31 of cell 18, shown in dotted lines, make contact with the required portions of the printed circuit.

Obviously many modifications and variations of the present invention are possible in the light of the above teachings. It is therefore to be understood that within the scope of the appended claims the invention may be practiced otherwise than as specifically described.

What I claim is:

1. A coupling device comprising a frame of non-conducting material having a first side, means on said first side for receiving electron tube pins, a second side opposite to and spaced from said first side, a circuit on said second side, a plurality of conducting springs mounted on said first side, a first leg of each spring in juxtaposition with said pin receiving means and adapted to be contacted by an electron tube pin, the second leg of each spring extending into the space between said first and second sides, whereby a cell may be inserted into said space and be contacted and resiliently held between the second legs of said springs and said circuit.

2. The apparatus of claim 1, the first leg of each of said spring members having an inwardly directed end thereon, said end being engageable by an electron tube pin.

3. The apparatus of claim 2, each of said first legs of said springs having a hole therein, and a plurality of lugs extending from said first side, each of said lugs passing through the hole in said spring first leg, to thereby position said springs on said first side.

4. The apparatus of claim 1, said conducting springs being U-shaped.

5. The apparatus of claim 4, the bight of each of said U-shaped springs extending around the edge of said first side, whereby to provide access to said springs to determine the voltage at the pins.

References Cited in the file of this patent

UNITED STATES PATENTS

| | | |
|---|---|---|
| 2,176,671 | Huth | Oct. 17, 1939 |
| 2,474,988 | Sargrove | June 5, 1949 |
| 2,590,804 | Vitale | Mar. 25, 1952 |
| 2,593,034 | Kafka | Apr. 15, 1952 |
| 2,602,842 | Morris et al. | July 8, 1952 |
| 2,603,681 | Salisbury | July 15, 1952 |
| 2,637,763 | Palmer | May 5, 1953 |
| 2,647,990 | Peterson | Aug. 4, 1953 |
| 2,740,097 | Edelman | Mar. 27, 1956 |
| 2,772,380 | Andrew | Nov. 27, 1956 |

FOREIGN PATENTS

| | | |
|---|---|---|
| 39,787 | France | March 1932 |